(12) United States Patent
Delker et al.

(10) Patent No.: US 8,479,266 B1
(45) Date of Patent: Jul. 2, 2013

(54) NETWORK ASSIGNMENT APPEAL ARCHITECTURE AND PROCESS

(75) Inventors: Jason R. Delker, Olathe, KS (US); John M. Everson, Leawood, KS (US); James W. Norris, Kansas City, MO (US); Carol A. Ross, Shawnee, KS (US); Jason K. Whitney, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1027 days.

(21) Appl. No.: 12/270,568

(22) Filed: Nov. 13, 2008

(51) Int. Cl.
*G06F 21/00* (2006.01)
*G06F 15/177* (2006.01)
*H04L 29/06* (2006.01)
*G06F 15/16* (2006.01)

(52) U.S. Cl.
USPC ......... 726/4; 726/1; 726/3; 709/221; 709/229

(58) Field of Classification Search
USPC .................................. 726/1–6; 709/220–226
See application file for complete search history.

(56) References Cited

U.S. PATENT DOCUMENTS

| | | | | |
|---|---|---|---|---|
| 5,959,990 | A * | 9/1999 | Frantz et al. | 370/392 |
| 6,088,801 | A | 7/2000 | Grecsek | |
| 6,304,901 | B1 * | 10/2001 | McCloghrie et al. | 709/221 |
| 6,539,388 | B1 | 3/2003 | Hattori et al. | |
| 7,370,346 | B2 * | 5/2008 | Congdon | 726/4 |
| 7,523,484 | B2 * | 4/2009 | Lum et al. | 726/1 |
| 7,551,619 | B2 * | 6/2009 | Tiwari | 370/392 |
| 7,606,232 | B1 * | 10/2009 | Ruben et al. | 370/392 |
| 7,684,438 | B2 | 3/2010 | Stephens et al. | |
| 7,698,394 | B2 | 4/2010 | Helmerich | |
| 7,720,031 | B1 * | 5/2010 | Cheng et al. | 370/331 |
| 7,735,114 | B2 * | 6/2010 | Kwan et al. | 726/1 |
| 7,822,982 | B2 * | 10/2010 | Raikar | 713/171 |
| 7,898,982 | B2 * | 3/2011 | Sridhar et al. | 370/254 |
| 7,983,258 | B1 * | 7/2011 | Ruben et al. | 370/389 |
| 8,032,942 | B2 | 10/2011 | Smith et al. | |
| 8,059,641 | B1 | 11/2011 | Rai | |
| 8,189,600 | B2 * | 5/2012 | Jabr et al. | 370/395.53 |
| 8,245,270 | B2 * | 8/2012 | Cooperstein et al. | 726/1 |
| 2002/0009078 | A1 | 1/2002 | Wilson et al. | |
| 2002/0112052 | A1 | 8/2002 | Brittingham et al. | |
| 2003/0084165 | A1 * | 5/2003 | Kjellberg et al. | 709/227 |

(Continued)

OTHER PUBLICATIONS

Delker, Jason R., et al., Patent Application entitled, "Dynamic Network Policies Based on Device Classification," filed Nov. 13, 2008, U.S. Appl. No. 12/270,554.

(Continued)

*Primary Examiner* — Linglan Edwards (57) ABSTRACT

A system is provided that comprises a computer system, a database, and an application that, when executed on the computer system, receives a message containing notification that an unauthorized communication from a client device has been attempted, searches the database for policies associated with a network resource invoked by the unauthorized communication, and determines authorization for association with policies permitting the client device access to the network resource. The system terminates the client device association with a first virtual local area network and sends a reply to a virtual local area network access device and a gateway device containing information to one of modify and replace a virtual local area network interface associated with the first virtual local area network on each component to provision a second virtual local area network. The system also activates association with the second virtual local area network providing access to the network resource.

10 Claims, 6 Drawing Sheets

U.S. PATENT DOCUMENTS

| | | | |
|---|---|---|---|
| 2003/0217148 A1* | 11/2003 | Mullen et al. | 709/225 |
| 2004/0218538 A1 | 11/2004 | Wiedeman et al. | |
| 2005/0165953 A1* | 7/2005 | Oba et al. | 709/238 |
| 2005/0210241 A1 | 9/2005 | Lee et al. | |
| 2006/0168648 A1* | 7/2006 | Vank et al. | 726/4 |
| 2006/0206933 A1 | 9/2006 | Molen et al. | |
| 2006/0212549 A1* | 9/2006 | Hokkyo et al. | 709/220 |
| 2006/0250979 A1 | 11/2006 | Gauweiler et al. | |
| 2006/0259624 A1 | 11/2006 | Hu et al. | |
| 2006/0268749 A1 | 11/2006 | Rahman et al. | |
| 2006/0274744 A1 | 12/2006 | Nagai et al. | |
| 2006/0274774 A1 | 12/2006 | Srinivasan et al. | |
| 2007/0250833 A1 | 10/2007 | Araujo, Jr. et al. | |
| 2007/0266432 A1 | 11/2007 | Hara et al. | |
| 2008/0172492 A1* | 7/2008 | Raghunath et al. | 709/229 |
| 2008/0198858 A1 | 8/2008 | Townsley et al. | |
| 2008/0229393 A1* | 9/2008 | Congdon | 726/4 |
| 2008/0270606 A1 | 10/2008 | Gooch et al. | |
| 2008/0285557 A1 | 11/2008 | Zheng et al. | |
| 2008/0320585 A1 | 12/2008 | Ansari et al. | |
| 2009/0006585 A1 | 1/2009 | Chen | |
| 2009/0178119 A1* | 7/2009 | Macauley | 726/4 |
| 2009/0199285 A1 | 8/2009 | Agarwal et al. | |
| 2009/0219834 A1 | 9/2009 | Babbar et al. | |
| 2009/0268737 A1 | 10/2009 | Giles et al. | |
| 2009/0304007 A1 | 12/2009 | Tanaka et al. | |
| 2010/0071024 A1 | 3/2010 | Eyada | |
| 2010/0080238 A1 | 4/2010 | Allan et al. | |
| 2010/0238813 A1 | 9/2010 | Allan et al. | |
| 2011/0004913 A1 | 1/2011 | Nagarajan et al. | |
| 2011/0103259 A1 | 5/2011 | Aybay et al. | |
| 2012/0131573 A1 | 5/2012 | Dasari et al. | |
| 2012/0134291 A1 | 5/2012 | Raleigh | |

OTHER PUBLICATIONS

Delker, Jason R., et al., Patent Application entitled, "Dynamic Firewall and Dynamic Host Configuration Protocol Configuration," filed Nov. 13, 2008, U.S. Appl. No. 12/270,537.

First Action Interview Pre-Interview Communication dated Apr. 11, 2012, U.S. Appl. No. 12/270,537, filed Nov. 13, 2008.

First Action Interview Pre-Interview Communication dated Jun. 13, 2012, U.S. Appl. No. 12/270,554, filed Nov. 13, 2008.

Notice of Allowance dated Aug. 16, 2012, U.S. Appl. No. 12/270,554, filed Nov. 13, 2008.

Notice of Allowance dated Aug. 7, 2012, U.S. Appl. No. 12/270,537, filed Nov. 13, 2008.

Delker, Jason R., et al., Patent Application entitled, "Dynamic Firewall and Dynamic Host Configuration Protocol Configuration", filed Sep. 13, 2012, U.S. Appl. No. 13/612,830 IDF 5742A.

* cited by examiner

NETWORK ASSIGNMENT APPEAL ARCHITECTURE AND PROCESS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A virtual local area network is a logical local area network that extends beyond a single traditional local area network to a group of local area network segments. A virtual local area network has the same attributes as a physical local area network, but it allows for end stations to be grouped together even if they are not located on the same network switch or segment. Because a virtual local area network is a logical entity, its creation and configuration is done in software instead of by physically relocating devices. Traditional network designs use routers to create broadcast domains and limit broadcasts between multiple subnets. Virtual local area network software permits the same broadcast domain to extend beyond a single segment and provides the segmentation services traditionally provided by routers in local area network configurations. Virtual local area networks may permit control of traffic patterns and more expedient reaction to device relocations. Virtual local area networks may also provide the flexibility to adapt to changes in network requirements and allow for simplified administration including relief from duties of managing resource permissions.

SUMMARY

In an embodiment, a dynamic network policy changes system is provided. The system includes at least one computer system, a database, and a dynamic network policy changes application that, when executed on the at least one computer system, receives a message containing notification that an unauthorized communication from a client device has been attempted, searches the database for policies associated with a network resource invoked by the unauthorized communication, and determines authorization for association with policies permitting the client device access to the network resource. The system also terminates the association of the client device with a first virtual local area network and sends a reply to a virtual local area network access device and a gateway device containing information to one of modify and replace a virtual local area network interface associated with the first virtual local area network on each component to provision a second virtual local area network. The system also activates association with the second virtual local area network providing access to the network resource.

In another embodiment, a method of dynamically provisioning a first virtual local area network is provided. The method comprises receiving a request from an access device for configuration information to provision a first virtual local area network, the request arising from an attempt by a client device to access a first virtual local area network. The method also comprises obtaining a virtual local area network tag, internet protocol interface information, and a policy from resource pools in a database and creating messages for the access device and a gateway device, the messages comprising configuration information and instructions to configure interfaces on the access device and the gateway device to provision the first virtual local area network requested by the client device. The method also comprises sending the messages to the access device and the gateway device, receiving messaging from the access device and the gateway device indicating that interfaces have been configured on each, and providing notice directly to the client device that the first virtual local area network requested by the client device has been provisioned and may be accessed.

In another embodiment, a method of dynamically changing network policies is provided. The method comprises receiving notification from a gateway device that a client device associated with a first virtual local area network has unsuccessfully attempted a communication with a privileged network resource not accessible from the first virtual local area network, examining network policies associated and user profiles associated with the client device, and examining network policies associated with the privileged network resource. The method also comprises determining that the examined network policies and user profiles provide for the client device to access the privileged network resource from a second virtual local area network, dissociating the client device from the first virtual local area network, and associating the network policy permitting access to the privileged network resource with a second virtual local area network. The method also comprises enabling the interfaces on the access device and gateway device to process traffic associated with the second virtual local area network by one of providing a new virtual local area network designation to the interface established for the first virtual local area network and provisioning a new interface. The method also comprises associating the client device with the second virtual local area network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a dynamic network policy changes system permit a client device associated with a virtual local area network and accessing a specific group of network services to trigger a policy change by the system by requesting access to a network resource or service not available while associated with the current virtual local area network. The system detects that the client device has attempted an action that is not permitted by network policies associated with the client device's current virtual local area network designation. The system reports the attempted access to an authorization server that analyzes the prohibited action and determines whether network policies exist that may allow the client device to be associated with a different virtual local area network that does have the needed access to the requested resource. Policies may be used to restrict access to specialized network resources and destinations that require specific rights, protocols, security clearances, and access to ports on gateway devices such as routers and firewalls. Policies created for different and perhaps privileged network resources may allow access to the resources by requiring client devices to be associated with a different virtual local area network with required rights and a level of security appropriate for the requested resource.

A client device associated with network policies related to standard user activities on an enterprise network may be assigned a general virtual local area network designation that does not permit access to certain additional resources on the enterprise network. Such additional resources may include internal resources such as voice-over-Internet Protocol (VoIP) services, streaming video services, database lookup services, as well as external services such as virtual private network (VPN) access. Embodiments of a dynamic network policy changes system permit a client device with the appropriate authorization to dynamically be treated according to a different set of network policies and to be transitioned from a first virtual local area network with common enterprise applications-level of permissions to a second virtual local area network with different access to the more specialized network resources and/or services described.

A client device and its associated user may be qualified, by user identity and by device type, to be granted very extensive privileges on an enterprise network. The present disclosure, however, limits the privileges of such client devices while those devices are using the most common and most secure services—such as email, printing a file, accessing a server drive. Upon request, the qualified client device is dynamically granted the different set of rights, via dynamic transfer of the client device from a first virtual local area network to a second virtual area network associated with the different rights, only temporarily while invoking the specific service needing the more different rights, for example accessing voice-over-Internet Protocol (VoIP) services, performing a database lookup, and accessing a virtual private network (VPN) connection. Thus, the present disclosure segregates the more specialized and perhaps more privileged virtual private network activities accessible from a second virtual local area network from the general internal enterprise network that may be accessible from a first virtual local area network to manage traffic flow and prohibit unauthorized users as well as protect the internal enterprise network from potentially harmful traffic coming from external sources. Embodiments of the system may permit the client device to be returned to the first virtual local area network when the client device's activities on the second virtual local area network are completed.

A user operating a client device with normal permissions accessing electronic mail and standard applications on an enterprise may be associated with a virtual local area network used for such general activities. The client device may initiate an action such as requesting internal services that may include internal services such as streaming video or database lookups or external services such as launching a virtual private network that are not permitted of the client device while associated with the general virtual local area network. In an embodiment, when such an attempted access of a privileged resource is detected on a network, the component on the network that detects the attempt may report the attempted access to the authorization server in an effort to both maintain vigilance on the network but also provide service to client devices.

Changing the client device's association from the general or first virtual local area network to a second and more privileged virtual local area network wherein the client device receives access to the requested service or network resource is a process that may be minimally perceptible to the client device and completed rapidly. In an embodiment, the client device may not need to re-authenticate its entry port on the virtual local area network through which it initially accessed the first virtual local area network. The internet protocol interfaces on the access device and the gateway device that were created for the first virtual local area network used by the client device may still be used with only the virtual local area network tag altered to implement the change. The new virtual local area network tag would contain an association with the policy permitting access to the level of privileges needed to access the requested network services. The components on the access device and other network devices that monitor and restrict traffic flow would identify the new virtual local area network tag, recognize the different associated policy, and permit the client device access to the requested services that had previously been blocked.

Figure 1:
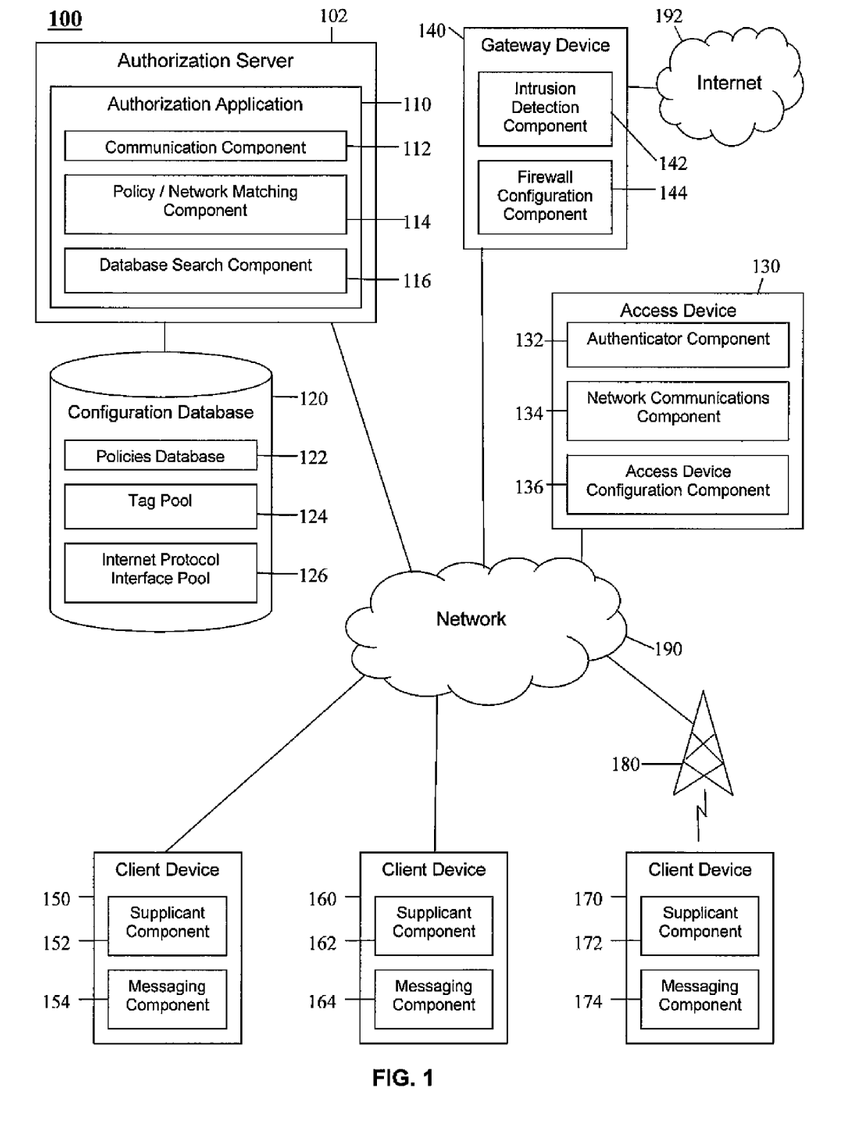
FIG. 1 is a block diagram of a system according to an embodiment of the disclosure.

Turning to FIG. 1, a system 100 for dynamically changing network policies is described. The system 100 comprises an authorization server 102, a configuration database 120, an access device 130, a gateway device 140, a client device 150, a wireless base station 180, a network 190, and an Internet 192. Embodiments of the system 100 typically comprise an indefinite number of additional client devices 160, 170. The use of the terms client device 150 and client devices 150 may be taken to represent any client device 150, 160, 170 singly or combination of client devices 150, 160, 170.

The authorization server 102 may be any general purpose computer system, as discussed in greater detail hereinafter. The authorization server 102 may comprise one computer or a plurality of computers, for example a server farm wherein many server computers cooperate to share a processing load. The authorization server 102 may comprise a plurality of computers that are located at different places, for example to provide geographical diversity and increased service reliability. The authorization server 102 executes one or more applications that provide services to at least one of the client devices 150 including hosting of the authorization application 110.

The authorization application 110 executes on the authorization server 102 and receives messages from components on the network about unsuccessful access attempts directed at specific resources on the network that may require different access rights. The communication attempts are unsuccessful because at the time the attempts are made, the client devices 150 are associated with virtual local area networks and/or network policies that do not permit access to the specific resources. Access to the specific resources may require a change in network policies. Such a change may be triggered by a client device 150 launching an application that attempts to communicate over a specific port on a network device or attempting to send packets to a specific network or Internet protocol (IP) address. The change in network policy and transition to a different virtual local area network may be triggered by the a client device 150 submitting a form on a web page, by attempting to access a specific uniform resource locator (URL) on a web page, or when a specific domain name system (DNS) is queried. In an embodiment, software may be installed on a client device 150 that may indicate the network policy needed by the client device 150 for a particular network service invoked by the client device 150.

Network policies on an enterprise network may be used to limit the types of network resources accessible to various classes of client devices 150 and users. Network policies are often enforced by segregating client devices 150 or users by types and services needed and associating the groupings or individual client devices 150 with virtual local area networks that are assigned restrictive policies. Policies may be then enforced at network gateway devices 140 and other elements. Policies may apply to ports on the gateway devices 140 and the types of traffic that may pass through the ports. A client device 150 with typical permissions on an enterprise network may use electronic mail, an enterprise intranet, and standard network-based applications. The client device 150 may not be able to access a specialized internal resource or commence a virtual private network session to contact a resource outside of the enterprise network without being required to physically sever the connection to the enterprise network, access a different network access point, and activate different client software including loading a new suite of protocols.

The authorization application 110 comprises a communications component 112 that engages the other components of the system 100 in communications about the initial provisioning of virtual local area networks, exchanges messaging with various network devices about unauthorized access attempts by client devices 150, and communicates about virtual local area network association changes made for client devices 150 to accommodate their need to access resources with different access levels.

The authorization application 110 also comprises a policy/network matching component 114 that matches network policies with virtual local area networks. When a network device reports to the authorization application 110 that a client device 150 has attempted an unauthorized access to a network resource provided by the network device, the policy/network matching component 114 attempts to identify a policy or combination of policies that will permit the client device 150 to be associated with a different virtual local area network that has access to the desired network service. The policy or combination of policies identified by the policy/network matching component 114 that permit the client device 150 to be associated with a different virtual local area network providing access to the requested network resource sought by the client device 150 may be associated with the client device 150, the requested network resource, or both. The policy/network matching component 114 may locate more than one policy or combination of policies that permit the client device 150 to be associated with the different virtual local area network that allows access to the desired resource. If this occurs, the policy/network matching component 114 will associate the client device 150 with the policy or combination of policies that permits the greatest efficiency and economy of resources for the client device 150 and the enterprise network. The policy/network matching component 114 may be unable to locate a policy or combination of policies to accommodate the attempt by the client device 150 to access the requested network resource, in which case the client device 150 will remain associated with its original virtual local area network and may receive an error message or other transmission about the inaccessibility of the requested network resource.

The authorization application 110 also comprises the database search component 116 that searches the components of the configuration database 120 for information requested by the authorization application 110. The database search component 116 searches for policies that apply to any of the client device 150, user, and/or the requested network resource that when combined permit the client device 150 to be associated with a different virtual local area network that has access to the requested network resource. The database search component 116 receives instructions from the authorization application 110 about the databases to search and the policies to locate. If dynamically created virtual local area network interfaces are being used, the database search component 116 also searches the configuration database 120 for information to establish interfaces on the gateway device 140 and the access device 130 when a new virtual local area network is being provisioned for client devices 150 first receiving association with a virtual local area network. The database search component 116 also searches components of the configuration database 120 when existing interfaces on the access device 130 and gateway device 140 are being provided new virtual local area network tags at the time the client device 150 is being associated with a different virtual local area network to receive access to a requested network resource. The terms authorization application 110 and dynamic network policy changes application represent the same component and may be used interchangeably. In an embodiment, client devices 150 requesting access to services on a network may receive association with a virtual local area network wherein the required network interfaces on access devices 130 and gateway devices 140 are dynamically created by randomly drawing interface configuration from pools, configuring the interfaces on the devices and associating the interfaces with virtual local area network tags associated with policies granting access to the requested services.

The configuration database 120 is associated with the authorization server 102 and is the repository of network policies and information used to provision and configure virtual local area networks. The configuration database 120 comprises the policies database 122 that stores policies that are applied to devices, virtual local area networks, and resources that may be accessible from a virtual local area network. Such resources may be invoked, for example, by a client device 150 launching an application that attempts to communicate over a specific port on a network device, attempting to send packets to a specific network or internet protocol (IP) address, submitting a form on a web page, attempting to access a specific uniform resource locator (URL) on a web page, or querying a specific domain name system (DNS) address. Policies describe when, how, by whom, and to what level of access a resource on a network may be accessed. Policies both limit a network device's or other entity's actions on a network as well as limit the accessibility to the device by other entities. Client devices 150 with similar resource needs may each be associated with an individually instantiated virtual local area network with a single policy assigned to each instance of the virtual local area network. Each client device 150 may be associated with its own individual virtual local area network with each individual virtual local area network associated with the same typical enterprise user policy. The use of individual virtual local area networks to associate client devices 150 with similar resource needs and providing virtual local area network access to resources using a policy associated with the resources may reduce the management burden, network traffic, and security risks that may arise from providing standard user or group permissions to the client devices 150 and then allowing the client devices 150 to contact the desired resource directly. Using virtual local area networks and policies instead of providing permissions to users also relieves the desired resource from having to read and interpret user and group permissions provided by the many types of devices, users, and other entities on a network that may attempt to directly request access to the desired network resource. The use of virtual local area networks as a vehicle to connect users and groups with resources as opposed to connecting users and groups directly with resources may promote better overall network performance. The policies database 122 is drawn upon by the database search component 116 of the authorization application 110 when a client device 150 first enters the enterprise network and seeks access to network resources. The policies database 122 is also drawn upon when a client device 150 requests access to a network resource from which it is barred and the authorization application 110 attempts to locate a policy and associated virtual local area network with which the client device 150 may be associated and provided the requested access.

In addition to policies, the configuration database 120 also stores configuration and other information provided to devices on a network to configure or change virtual local area network tags for a client device 150. The configuration database 120 comprises the tag pool 124 that is a collection of names, numbers, or other designations provided to virtual local area networks when they are created. Virtual local area network tags may alternatively be referred to as 802.1Q tags. When a client device 150 currently associated with a first virtual local area network requests access to services available only by association with a second virtual local area network, as long as policies associated with the second virtual local area network permit access to the client device 150, providing the client device 150 the access it is requesting may only require that the virtual local area network tag associated with the client device 150 is changed from the virtual local area network tag associated with the first virtual local area network to the virtual local area network tag associated with the second virtual local area network. The configuration database 120 also comprises the internet protocol interface pool 126 that stores the information needed to configure the internet protocol interfaces on network devices as needed by the authorization application 110 if dynamically created interfaces are being used. Information associated with configuring an internet protocol interface comprises an internet protocol address, an internet protocol subnet mask, an internet protocol default gateway, a domain name system (DNS) server, and a dynamic host control protocol (DHCP) server. In embodiments, the internet protocol interface pool 126 may comprise sub-pools that each contain a quantity of the specific individual elements or combinations of the individual elements described above that together allow an internet protocol interface to be configured on the network devices.

When static virtual local area network interfaces are used, the necessary internet protocol interfaces are already established and assigned to the appropriate physical ports on network devices. Virtual local area network tags are associated as client devices 150 seek access to network services. When dynamic virtual local area network interfaces are used, new internet protocol interfaces may be provisioned on the access device 130 and the gateway device 140. Provisioning of interfaces requires identifying a physical port on each device and providing each port with internet protocol subnet information and a virtual local area network tag. The internet protocol interface pool 126 and the tag pool 124 are drawn upon by the database search component 116 for this information and the information is provided to the authorization application 110. The authorization application 110 sends the provisioning information to the access device 130 and the gateway device 140 with instructions to create internet protocol interfaces on the devices and associate the interfaces with the virtual local area network tag provided.

When a client device 150 that is presently associated with a statically configured virtual local area network accesses a network resource that requires the client device to be associated with a different virtual local area network, the internet protocol interface on the access device 130 and the gateway device 140 may remain as configured. Only the virtual local area network tag need be changed. With static interfaces, the authorization application 110 sends the new virtual local area network tag information only to the access device 130. The access device 130 then associates its existing internet protocol interface with the newly received virtual local area network tag. A client device 150 is not directly associated with a subnet interface. Rather, a client device 150 receives association with a statically configured interface on an access device 130 through the action of the access device 130 using a virtual local area network tag to link or associate the client device 150 with the subnet interface. A client device 150 seeks access to resources and may not explicitly know of or care about the operation of a virtual local area network. It is the access device 130 acting upon the instruction of the authorization application 110 that provides the client device 150 association with a virtual local area network tag that then provides the client device 150 access to the resource on the network it has requested. In the event a client device 150 needs to be moved from one virtual local area network to another, the access device 130 needs only to change the virtual local area network tag that is associated with the client device 150. This action, which may be almost instantaneous and entirely transparent to the client device 150, will change the client device 150 from one static interface defined on the access device 130 to a different static interface defined on the access device 130.

The access device 130 is the first device contacted by a client device 150 when the client device 150 seeks to access resources on an enterprise network. The access device 130 may be a single physical device or more than one physical device that have similar functionality and perform substantially the same tasks in connection with the system 100. The access device 130 may be an Ethernet switch, WiFi access point, edge switch, other wireless access point, or other device with the capability to control physical access to a network based on the authentication status of the client device 150.

The access device 130 comprises the authenticator component 132 that when dynamic interfaces are being used engages the client device 150 to complete port-based authentication at the time the client device 150 makes the initial contact with the access device 130. Port-based authentication occurs before the access device 130 forwards a request to the authorization server 102 for configuration information to provision virtual local area network interfaces when dynamic interfaces are being used. The authenticator component 132 verifies the identity of the client device 150 and authorizes the client device 150 to transmit traffic to and through the access device 130. The physical port on the access device 130 is closed to network traffic from the client device 150 until the authenticator component 132 authenticates the client device 150. Port-based authentication is described in standard 802.1x issued by the Institute of Electrical and Electronics Engineers (IEEE) and is well known to those skilled in the art.

The access device 130 also comprises the network communications component 134 that handles communication between the access device 130 and the other components of the system 100 including the client device 150 and the authorization server 102. The network communications component 134 has the functionality to read, process, and reply to messages sent by the authorization server 102 and the client device 150. The access device 130 also comprises the access device configuration component 136 that when dynamic interfaces are being used takes the configuration information received from the authorization server 102 to configure the necessary interface on the access device 130. When dynamic interfaces are being used, the access device configuration component 136 receives the internet protocol address, subnet mask, and other information needed to configure the new interface on the access device 130, configures the interface, and associates the interface with the virtual local area network tag and physical port designation also received from the authorization server 102. The access device configuration component 136 also contains functionality to understand and carry out instructions received in the transmission from the authorization server 102 that accompany the requested configuration information.

The gateway device 140 provides connection to the Internet 192 for the client device 150 and other devices on the network 190 through a secure network port or ports on the gateway device 140. The gateway device 140 may be a dedicated physical device or functionality resident on another device that inspects and regulates traffic flowing through its ports. The gateway device 140 is the component of the system 100 through which the client device 150 using a virtual local area network may make contact with resources on the Internet 192. When dynamic interfaces are being used, an Internet protocol interface is configured on the gateway device 140 to instantiate the virtual local area network per the request of the client device 150. The gateway device 140 may also concurrently provide access to the Internet 192 to other devices on the network 190 unrelated to the client device 150 and unrelated to security levels and network traffic in connection with the virtual local area network instantiated for the client device 150. The gateway device 140 may also concurrently provide access to the Internet 192 to devices that are not components of the system 100. The gateway device 140 has functionality to segregate network traffic intended for the client device 150 on a virtual local area network from other traffic originating from the Internet 192 or elsewhere.

The gateway device 140, as the gateway or access point to the Internet 192, has network ports that devices in the system 100 may access when attempting to initiate a virtual private network session and contact a party outside the system 100 or otherwise contact an external resource or party. The network ports are examples of the types of network resources that a client device 150 on a virtual local area network may attempt to access, be denied access, and in embodiments of the pending application be given consideration for association with a different virtual local area network with policy associations that do allow the client device 150 access to the requested port or other resource.

The gateway device 140 comprises an intrusion detection component 142 that detects when a network port or other resource on the gateway device 140 receives an unauthorized access attempt from a client device 150 or other device in the system 100 seeking to initiate a virtual private network session with or otherwise contact a party or resource outside of the enterprise network. Access to network ports on the gateway device 140 is guarded and enforced by policies associated with the ports. Upon detecting the unauthorized access attempt, the intrusion detection component 142 sends a message to the authorization application 110 notifying it of the attempt whereupon the authorization application 110 begins the process of examining policies and considering the client device 150 for association with a different virtual local area network providing access to the network port or other requested resource on the gateway device 140. The intrusion detection component 142 actively monitors ports and other resources on the gateway device 140 and assists in enforcing policies regarding resources with limited access.

The gateway device 140 also comprises the firewall configuration component 144 that, when dynamic interfaces are being used, receives configuration information from the authorization server 102 and configures an interface on the gateway device 140 to enable the provisioning of a new virtual local area network. Similar to the access device 130, when dynamic interfaces are being used, the gateway device 140 configures a virtual local area network interface for a port using Internet protocol interface information and a virtual local area network tag received from the authorization server 102.

The client device 150 accesses services and resources on an enterprise network through association with a virtual local area network in accordance with policies associated with the virtual local area network. The client device 150 may also request access to or attempt to access network services to which it is not authorized on its current virtual local area network. This action may cause the authorization application 110 to be alerted thus initiating the process of attempting to associate the client device 150 with a different virtual local area network that will permit access to the requested network resource. The client device 150 may be one of a mobile telephone, personal digital assistant (PDA), laptop computer, tablet computer, desktop computer, and set-top box. The client device 150 comprises a supplicant component 152, 162, 172 that when dynamic interfaces are being used makes initial contact with the authenticator component 132 of the access device 130 to complete the port-based authentication required before the request to instantiate a virtual local area network may be furnished.

When dynamic interfaces are being used and the client device 150 has been authenticated via port-based authentication, it may then transmit its request to the access device 130 for a network service. The client device 150 also comprises a messaging component 154, 164, 174 that sends the message to the access device 130 with its request. When the virtual local area network has been created, the client device 150 uses the messaging component 154, 164, 174 to engage in communication with other components on the virtual local area network.

The wireless base station 180 may be any of a mobile telephone wireless base station, for example a Code Division Multiple Access (CDMA), Global System for Mobile Communications (GSM), and/or Universal Mobile Communications System (UMTS) mobile telephone wireless base station; a World-wide Interoperable Microwave Access (WiMAX) base station; a WiFi access point; a femtocell; or other wireless access device. A femtocell, also known as an access point base station, may be a small cellular base station.

The client device 150 may communicate with the network 190 via a wireless link to the wireless base station 180.

The network 190 promotes communication between the components of the system 100. The network 190 may be any communication network including a public data network (PDN), a public switched telephone network (PSTN), a private network, and/or a combination thereof.

The Internet 192 is a worldwide, publicly accessible series of interconnected computer networks that transmit data by packet switching using the standard internet protocol (IP). In an embodiment, the Internet 192 may be any network external to the network 190 that the client device 150 seeks to access.

Figure 2:
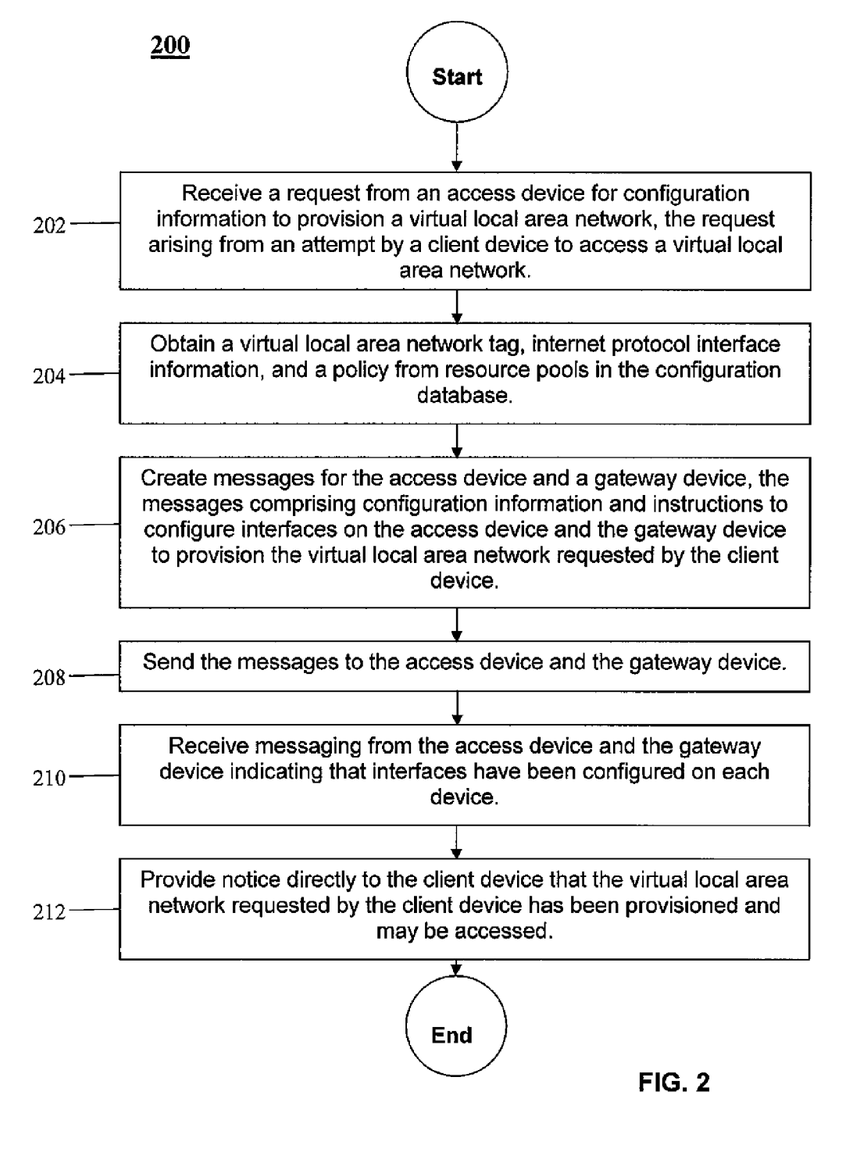
FIG. 2 is a flow chart illustrating a method according to an embodiment of the disclosure.

Turning to FIG. 2, a method 200 of dynamically provisioning a first virtual local area network is described. Internet protocol interfaces on virtual local area networks may be statically configured or dynamically configured. When statically configured, internet protocol address and associated configuration information are statically associated with physical ports on network devices. Only the virtual local area network tags associated with the internet protocol address and access port pairings change as client devices 150 using these internet protocol address and access port pairings change from one virtual local area network to another when their needs for network services change. Virtual local area network tags may move from one subnet Internet interface to another when the subnet interface is associated with access ports used to access the network. The method 200 is rather concerned with dynamically configured virtual local area network interfaces. The method 200 describes the steps involved in which a client device 150 first attempts to access services on an enterprise network wherein the client device 150 will be associated with a first virtual local area network.

Beginning at block 202, the communication component 112 of the authorization application 110 receives a request from the access device 130. The message contains a request to dynamically generate internet protocol configuration information, a virtual local area network tag, and a physical port designation. The request from the access device 130 to the authorization application 110 arises from the request the access device 130 has received from the client device 150 to provide access to network services.

The process that occurs at block 202 begins after the interactions for port-based authentication have taken place between the supplicant component 152 and the authenticator component 132 in which the identity of the client device 150 has been established by the access device 130 and the right of the client device 150 to send network traffic through the port on the access device 130 has been determined. Port-based authentication determines the rights of the client device 150 to access the port on the access device 130 and precedes the sending of traffic related to provisioning of a first virtual local area network.

At block 204, the database search component 116 of the authorization application 110 obtains internet protocol interface information and a virtual local area network tag from the internet protocol interface pool 126 and the tag pool 124, respectively. This information, along with a physical port designation, is to be sent to the access device 130 and the gateway device 140 for each device to configure interfaces and provision the first virtual local area network needed by the client device 150 to access desired network services. Before transmitting this information to the access device 130 and the gateway device 140, the database search component 116 also obtains from the policies database 122 a policy associated with the client device 150, the gateway device 140 or any other network device relevant to the request. The policy may describe, for example, any special requirements associated with the first virtual local area network requested by the client device 150 in terms of duration of the virtual local area network or limitations on the amounts or types of traffic permitted and related service levels granted the first virtual local area network with which the client device 150 will be associated.

In an embodiment with dynamic interfaces established for virtual local area networks, there is no relationship between the Internet protocol interface information drawn from the internet protocol interface pool 126 and the virtual local area network tag drawn from the tag pool 124. This information may be combined randomly and in an embodiment there may be benefit to the system 100 in doing so. Dynamically generating and randomly combining Internet protocol interface identifications and virtual local area network tags reduces some of the risks associated with virtual local area network identifications being permanently established and well known to many or all devices across a network.

At block 206, the communication component 112 of the authorization application 110 creates messages for the access device 130 and the gateway device 140 containing the internet protocol interface information, a virtual local area network tag, and the physical port to be used by those devices in configuring virtual local area network interfaces. The messaging framework of the dynamic host configuration protocol may be used to send this configuration information. The messages may also contain instructions to the access device 130 and the gateway device 140 to configure interfaces on the devices to provision the virtual local area network requested by the client device 150. The instructions may be related to a policy found in the policies pool 122 related to the client device 150 or the virtual local area network requested by the client device 150.

At block 208, the authorization application 110 sends the messages to the access device 130 and the gateway device 140 with the instructions to configure their interfaces with the internet protocol interface information and the accompanying virtual local area network tag and physical port designation. The access device configuration component 136 on the access device 130 and the firewall configuration component 144 on the gateway device 140 take delivery of the information contained in the messages, configure internet protocol interfaces pursuant to instructions received, and associate the interfaces with the virtual local area network tag and physical port also specified in the message from the authorization application 110. At block 208, the internet protocol interfaces are provisioned on the access device 130 and the gateway device 140.

At block 210, the authorization application 110 receives messages from the access device 130 and the gateway device 140 indicating that interfaces have been configured on each device and associated with the virtual local area network tag and physical port specified in the message. The authorization application 110 activates the first virtual local area network and at block 212 sends messaging directly to the client device 150 or to the access device 130 to be forwarded to the client device 150 providing notification that the first virtual local area network has been provisioned and may be accessed.

Figure 3:
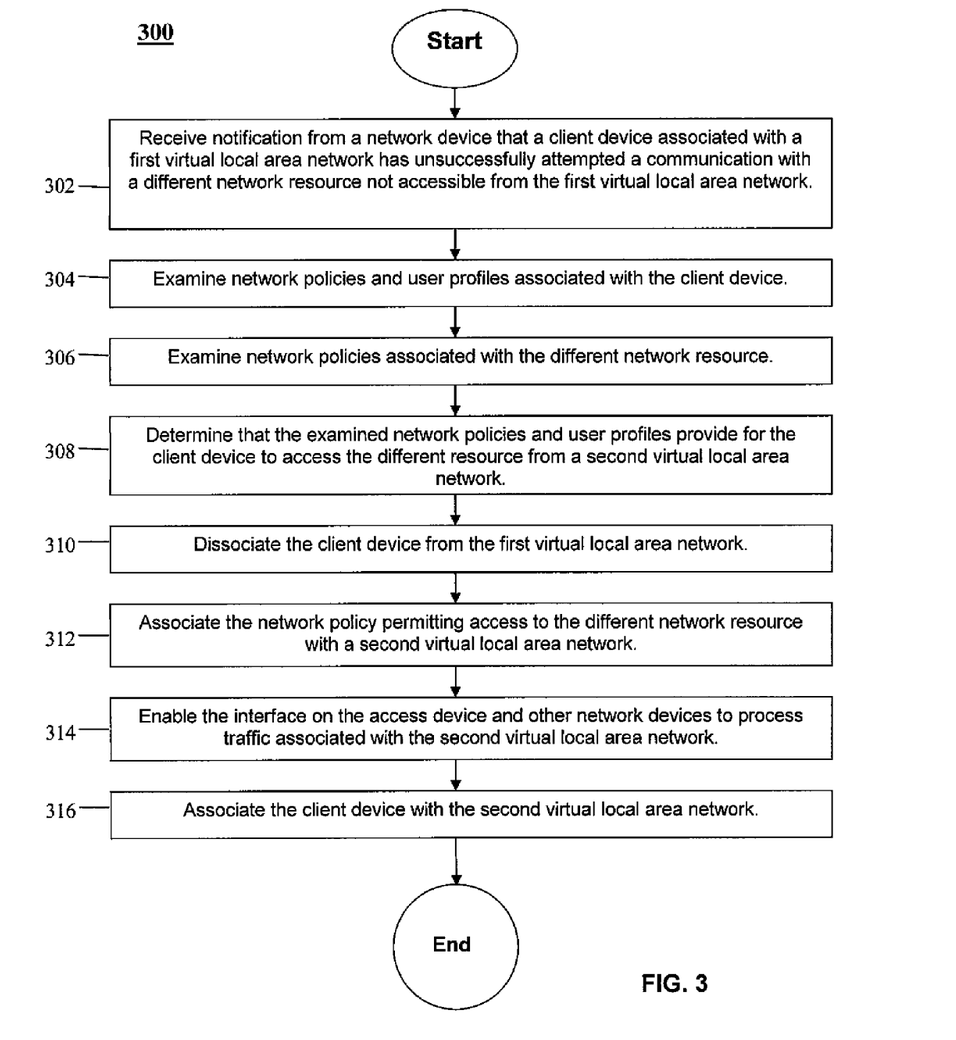
FIG. 3 is a flow chart illustrating another method according to an embodiment of the disclosure.

Turning now to FIG. 3, a method 300 of dynamically changing network policies is described. The method 300 describes a client device 150 in an enterprise network that is presently associated with a first virtual local area network and seeks access to network services that will require the client device 150 to be moved to a different virtual local area network. In an embodiment of the method 300, the client device 150 may be a desktop computer in a large organization. The client devices 150 and the parties who use them when associated with the first virtual local area network are granted ordinary permissions for accessing electronic mail, an intranet, and widely used enterprise applications. Most client devices 150 are as a rule associated with individual instantiations of the first virtual local area network as a general user policy is applied to the first virtual local area network allowing client devices 150 to send and receive electronic mail, navigate in the organization's intranet, and use standard applications. In an embodiment, each client device 150 is associated with its own individual private instance of the first virtual local area network, with all individual private virtual local area networks having the same or very similar policies When associated with the first virtual local area network in the method 300, client devices 150 are confined to standard user-type activities on a large enterprise network with the objectives of easing the burden of managing a large quantity of users as well as limiting security risks. Policies associated with the first virtual local area network may prevent client devices 150 from engaging in activities that burden the enterprise network with abnormally heavy traffic, entering areas wherein users may engage in unproductive activities, or accessing ports on a network that permit only certain types of restricted or privileged network traffic. A client device 150 seeking to initiate a virtual private network session with a party outside of the enterprise network may not be able to do so while associated with the first virtual local area network. Virtual private network activities may come in contact with external traffic from less well-known sources that may pose a risk to internal enterprise network traffic. Various policies may permit a client device 150 to separately have access to both secure, routine types of internal services as well as external virtual private network access and a user may have a great deal of expertise and awareness of security issues, but the risks of external traffic, which can carry viruses and other malicious agents, comingling with internal traffic and potentially causing data corruption or data loss inside an enterprise may be too great to permit simultaneous access. These risks underlie the need to segregate traffic originated by less well known external sources from secure internal traffic and are the reason that a client device 150 seeking to access a network resource providing external access may need to first dissociate from its first virtual private network association and its access to enterprise applications and electronic mail.

While the discussion of accessing network services in the method 300 has described attempts by a client device 150 to initiate a virtual private network session to establish contact with a party outside the system 100, the method 300 applies equally to the accessing of specialized network services that may be available exclusively to client devices 150 internal to an organization such as database lookups or streaming video. While the motivation for requiring association with a different virtual local area network for client devices 150 desiring virtual private network access may primarily be enterprise network security, the motivation for requiring association with a different virtual local area network for a client device 150 seeking access to specialized internal resources may be unrelated to security and may instead be driven by network traffic management concerns or a management desire to prevent certain classes or groups of employees from engaging in unproductive activities.

Beginning at block 302, the communication component 112 of the authorization application 110 receives a notification from a network device such as the gateway device 140. The notification advises the authorization application 110 that the client device 150, that is presently associated with an instance of the first virtual local area network, has attempted to access a network resource not accessible from the first virtual local area network. The network resource may be a network port allowing only certain network traffic such as the Internet protocol security (IPSec) suite of protocols or it may be an access point to a voice-over-Internet Protocol session. The client device 150 may alternatively have executed a domain name system (DNS) lookup operation or started client software that alerts the intrusion detection component 142 that an access of a privileged network resource is being attempted. While associated with instances of the first virtual local area network, the client device 150 and all other devices associated with instances of the first virtual local area network are not permitted to access the requested network resource because the requested network resource has a policy associated with it that bars all traffic originating from the first virtual local area network.

At block 304, the authorization application 110 examines network policies associated with the client device 150 as well as profiles and permissions associated with the user of the client device 150 in an effort to discover ways to allow the client device 150 to be associated with a different virtual local area network that is allowed access to the requested network resource. At block 306, the authorization application 110 goes through a similar process of examining policies associated with the requested resource. The authorization application 110 at blocks 304 and 306 is attempting to find a policy or some combination of policies regarding the requested resource, a virtual local area network that has access to the requested resource, and the client device 150 such that the client device 150 may be able to access the requested resource. In an embodiment, the requested resource may not be limited for security reasons at all, and every client device 150 in an enterprise is welcome to freely access the resource but the resource is accessible only from a separate virtual local area network for traffic management, network capacity, or volume reasons.

At block 308, the authorization application 110 successfully locates a policy or combination of policies associated with the requested resource, a virtual local area network that has access to the requested resource, and/or the client device 150 such that the client device 150 may be associated with a second virtual local area network with access to the requested resource. The authorization application 110 determines that the client device 150 must sever its association with the first virtual local area network in order to receive association with the second virtual local area network and receive access to the requested network resource. In an embodiment, the dissociation from the first virtual local area network may cause the connection of the client device 150 to all current application sessions from the first virtual local area network to be either immediately severed or severed after a warning period. In some embodiments, the authorization application 110 may provide the client device 150 an opportunity to withdraw its request for access to the requested network resource before its association with the first virtual local area network is broken. When a client device 150 is moved from one virtual local area network to another because it has taken an action and/or requested a service, this may cause a change in network policies associated with the client device 150 and the rights associated with the previous virtual local area network may be lost. Certain applications may no longer be available when a policy changes.

At block 310, the client device 150 is dissociated from the first virtual local area network and access to the electronic mail and enterprise applications received on the first virtual local area network is terminated. At block 312, the authorization application 110 associates the network policy or combination of network policies found that will permit the client device 150 access to the requested resource available to a second virtual local area network. The network policy or policies are associated with the second virtual local area network.

At block 314, the existing virtual local area network interface for the first virtual local area network on the access device 130 is provisioned with a new virtual local area network tag associated with the newly created second virtual local area network. The virtual local area network interfaces on the access device 130 and gateway device 140 used for the first virtual local area network remain as configured with the same Internet protocol addressing information and physical port designation. Only the virtual local area network tag is changed. The policy/network matching component 114 matches the newly created second virtual local area network with the tag associated with the policy or policies found at block 308 that will allow the client device 150 access to the requested resource. No further action needs to take place at either the access device 130 or other network device to accommodate the transition from the first virtual local area network to the second virtual local area network. The same virtual local area network interfaces are in place but they have been provisioned with a different virtual local area network tag and policy.

At block 316, the client device 150 is associated with the second virtual area network tag and this action completes the steps of changing the association of the client device 150 from the first virtual local area network to the second virtual local area network and providing the client device access to its requested resource. The second virtual local area network tag is also associated with the subnet interfaces previously configured on the access device 130 and gateway device 140. Those subnet interfaces have not changed. They have remained as configured previously on the same Internet protocol subnet. What has changed is that their virtual local area network tag designation with regard to the client device 150 has transitioned from the first virtual local area network tag to the second virtual local area network tag. If the changing of the virtual local area network tag associated with the client device 150 or any other action during the method 300 causes the previously configured virtual local area network interfaces on the access device 130 and gateway device 140 to be deleted, new interfaces on these devices may be provisioned and these interfaces may be associated with the virtual local area network tag associated with the second virtual local area network.

The discussion to this point has assumed that the transition of the client device 150 from its association with the first virtual local area network to the second virtual local area network to access the requested network resource has not involved a change of virtual local area network interfaces on the access device 130 and gateway device 140 other than replacing one virtual local area network tag and policy with another. The discussion assumed that the client device 150 in making the transition is not required by the system 100 to perform port-based authentication as described earlier or any other authentication. In an embodiment, the enterprise network may have security restrictions or the specific requested network resource desired by the client device 150 may be associated with a policy or policies that require any client device 150 seeking access to the requested network resource to fully re-authenticate using the port-based authentication described earlier. In this embodiment, the internet protocol interfaces on the network devices involved may be fully reprovisioned instead of merely being provided new virtual local area network tag(s). In the embodiment, most of the interactions between the authorization application 110, configuration server 120, access device 130, and gateway device 140 regarding dynamic interfaces described in the method 200 take place. In an embodiment, the second virtual local area network is a newly created virtual local area network instead of a renamed or retagged virtual local area network as is the case when the client device 150 is not required to re-authenticate.

At block 316, the authorization application 110 associates the client device 150 with the fully provisioned second virtual local area network which includes second virtual local area network tag associated with the subnet interfaces on the access device 130 and gateway device 140. The client device is associated with the virtual local area network tag for the second virtual local area network. The client device 150 may begin accessing the privileged network resource and the method 300 ends.

In an embodiment, when the client device 150 completes its activities with the requested network resource, the client device 150 may wish to return to a new instantiation of the first virtual local area network and begin using electronic mail and standard enterprise applications again as previously. The system 100 contains functionality that detects when the client device 150 severs its link with the second virtual local area network and queries the client device 150 if it prefers reconnection with its earlier set of enterprise applications. If the client device 150 replies that it prefers reconnection, the processes of changing the virtual local area network tag when static interfaces are being used or re-provisioning the a virtual local area network interface on the access device 130 and gateway device 140 when dynamic interfaces are being used may be performed to accommodate this preference.

Figure 4:
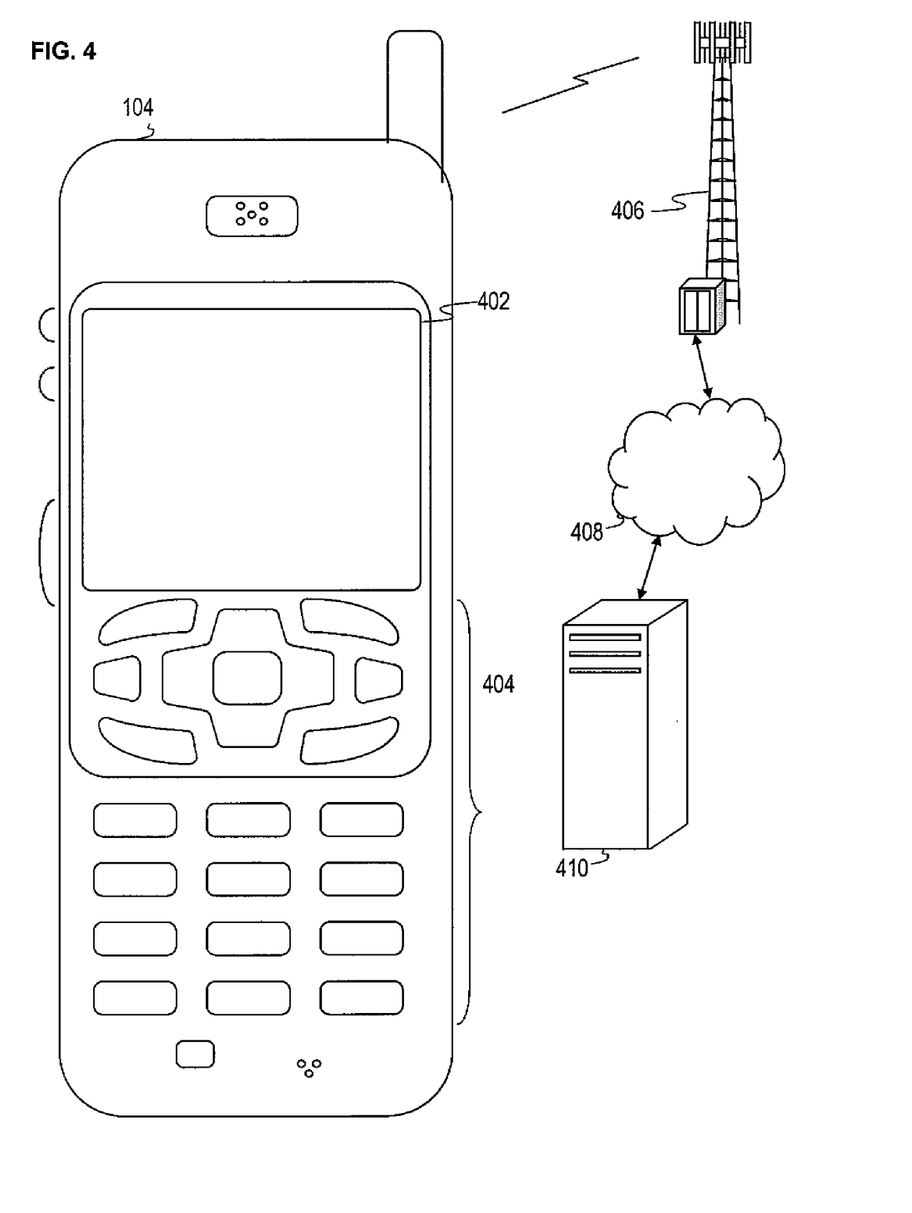
FIG. 4 is an illustration of a mobile device according to an embodiment of the disclosure.

FIG. 4 shows a wireless communications system including a mobile device 104. The mobile device 104 is an example of the client device 150. FIG. 4 depicts the mobile device 104, which is operable for implementing aspects of the present disclosure, but the present disclosure should not be limited to these implementations. Though illustrated as a mobile phone, the mobile device 104 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 104 is not a general purpose computing device like a portable, laptop or tablet computer, but rather is a special-purpose communications device such as a mobile phone, wireless handset, pager, or PDA. The mobile device 104 may support specialized activities such as gaming, inventory control, job control, and/or task management functions, and so on.

The mobile device 104 includes a display 402 and a touch-sensitive surface or keys 404 for input by a user. The mobile device 104 may present options for the user to select, controls for the user to actuate, and/or cursors or other indicators for the user to direct. The mobile device 104 may further accept data entry from the user, including numbers to dial or various parameter values for configuring the operation of the handset. The mobile device 104 may further execute one or more software or firmware applications in response to user commands. These applications may configure the mobile device 104 to perform various customized functions in response to user interaction. Additionally, the mobile device 104 may be programmed and/or configured over-the-air, for example from a wireless base station, a wireless access point, or a peer mobile device 104.

The mobile device 104 may execute a web browser application which enables the display 402 to show a web page. The web page may be obtained via wireless communications with a base transceiver station (BTS) 406, a wireless network access node, a peer mobile device 104 or any other wireless communication network or system. While a single base transceiver station 406 is illustrated, it is understood that the wireless communication system may comprise additional base transceiver stations. In some instances, the mobile device 104 may be in communication with multiple base transceiver stations 406 at the same time. The base transceiver station 406 (or wireless network access node) is coupled to a wired network 408, such as the Internet. Via the wireless link and the wired network, the mobile device 104 has access to information on various servers, such as a server 410. The server 410 may provide content that may be shown on the display 402. Alternately, the mobile device 104 may access the base transceiver station 406 through a peer mobile device 104 acting as an intermediary, in a relay type or hop type of connection.

Figure 5:
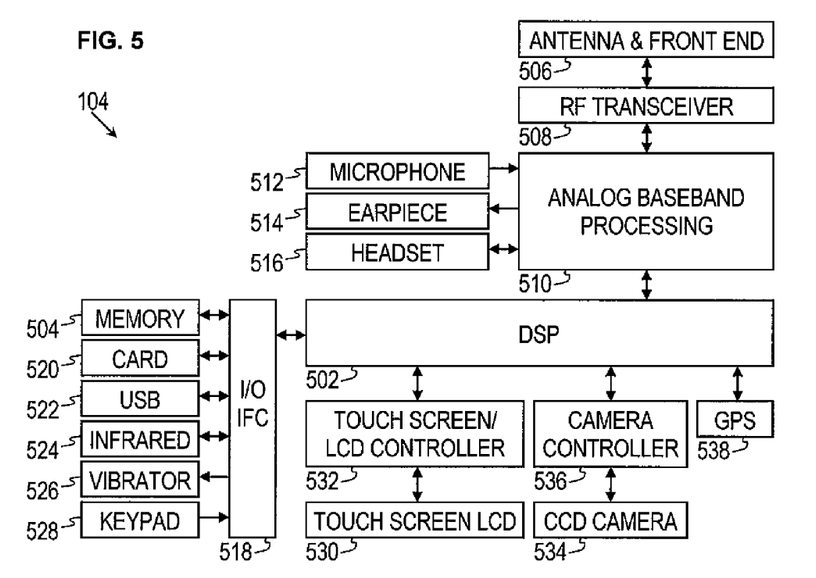
FIG. 5 is a block diagram of a mobile device according to an embodiment of the disclosure.

FIG. 5 shows a block diagram of the mobile device 104. While a variety of known components of handsets 104 are depicted, in an embodiment a subset of the listed components and/or additional components not listed may be included in the mobile device 104. The mobile device 104 includes a digital signal processor (DSP) 502 and a memory 504. As shown, the mobile device 104 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 104 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 104 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 104 to send and receive information from a radio access network (RAN) or some other available wireless communications network or from a peer mobile device 104. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 104 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 104 to function as a peripheral device to exchange information with a personal computer or other computer system. The infrared port 524 and other optional ports such as a Bluetooth interface or an IEEE 802.11 compliant wireless interface may enable the mobile device 104 to communicate wirelessly with other nearby handsets and/or wireless base stations.

The input/output interface 518 may further connect the DSP 502 to the vibrator 526 that, when triggered, causes the mobile device 104 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 104. Another input mechanism may be the touch screen LCD 530, which may also display text and/or graphics to the user. The touch screen LCD controller 532 couples the DSP 502 to the touch screen LCD 530.

The CCD camera 534 enables the mobile device 104 to take digital pictures. The DSP 502 communicates with the CCD camera 534 via the camera controller 536. The GPS sensor 538 is coupled to the DSP 502 to decode global positioning system signals, thereby enabling the mobile device 104 to determine its position. In another embodiment, a camera operating according to a technology other than charge coupled device cameras may be employed. Various other peripherals may also be included to provide additional functions, e.g., radio and television reception.

Figure 6:
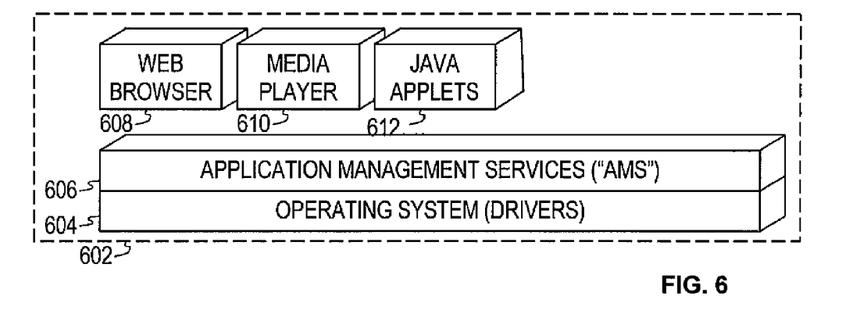
FIG. 6 is a block diagram of a software configuration for a mobile device according to an embodiment of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 104. Also shown in FIG. 6 are a web browser application 608, a media player application 610, and JAVA applets 612. The web browser application 608 configures the mobile device 104 to operate as a web browser, allowing a user to enter information into forms and select links to retrieve and view web pages. The media player application 610 configures the mobile device 104 to retrieve and play audio or audiovisual media. The JAVA applets 612 configure the mobile device 104 to provide games, utilities, and other functionality.

Figure 7:
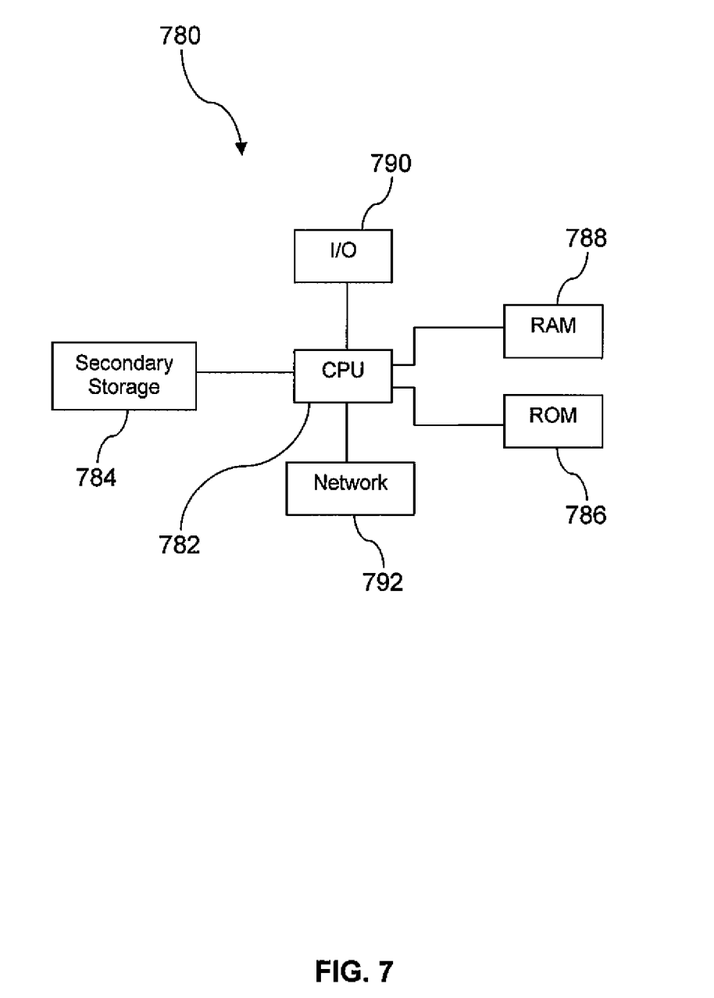
FIG. 7 illustrates an exemplary general purpose computer system suitable for implementing embodiments of the disclosure.

Some aspects of the system described above, for example the authorization server 102, the access device 130, and the gateway device 140, may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 792 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A dynamic network policy changes system, comprising:
   an at least one computer system comprising at least one non-transitory computer readable medium and at least one computer processor;
   a database; and
   a dynamic network policy changes application that, when executed on the at least one computer system,
      receives a message containing notification that an unauthorized communication from a client device associated with a first virtual local area network to a network resource has been attempted, wherein the network resource is not accessible from the first virtual local area network,
      searches the database for policies associated with the network resource invoked by the unauthorized communication,
      determines authorization for association with policies permitting the client device access to the network resource,
      terminates, in response to the determination of the authorization, the association of the client device with the first virtual local area network while remaining authenticated with the first virtual local area network,
      sends a reply to a virtual local area network access device and a gateway device containing information to one of modify and replace a virtual local area network interface associated with the first virtual local area network on each device to provision a second virtual local area network based on the determination of the authorization,
      activates association of the client device with the second virtual local area network, wherein the association with the second virtual local area network provides the client device temporary access to the network resource while remaining authenticated with the first virtual local area network, and
      re-associates the client device with the first virtual local area network in response to the client device ending the temporary access without having to re-authenticate the client device with the first virtual local area network.

2. The system of claim 1, wherein the client device is required to forfeit its association with the first virtual local area network and access to associated network resources in exchange for receiving association with the second virtual local area network and access to associated network resources.

3. The system of claim 1, wherein the message containing notification that an unauthorized communication has been attempted is received from a network component.

4. The system of claim 1, wherein the unauthorized communication originated by the client device while associated with the first virtual local area network is one of a request for streaming video, a database lookup, a request to initiate a voice-over-Internet Protocol session, a port communication through one of a gateway component and other network element, and a communication originating network traffic that alerts an intrusion detection system.

5. A method of dynamically changing network policies, comprising:
   receiving notification from a gateway device that a client device associated with a first virtual local area network has unsuccessfully attempted a communication with a privileged network resource not accessible from the first virtual local area network;
   examining network policies associated with and user profiles associated with the client device;
   examining network policies associated with the privileged network resource;
   determining that the network policies and user profiles provide for the client device to access the privileged network resource from a second virtual local area network;
   dissociating, in response to the determining that the network policies and user profiles provide for the client device to access the privileged network resource, the client device from the first virtual local area network while remaining authenticated with the first virtual local area network;
   associating the network policy permitting temporary access to invoke the privileged network resource with a second virtual local area network;
   enabling, in response to the determining that the network policies and user profiles provide for the client device to access the privileged network resource, the interfaces on the access device and gateway device to process traffic associated with the second virtual local area network by providing a new virtual local area network designation to the interface established for the first virtual local area;
   associating the client device with the second virtual local area network while remaining authenticated with the first virtual local area network; and
   re-associating the client device with the first virtual local area network in response to ending the invocation of the privileged network resource without having to re-authenticate the client device with the first virtual local area network.

6. The method of claim 5, wherein the client device re-authenticates before receiving association with the network policy and second virtual local area network.

7. The method of claim 5, wherein the privileged network resource accessible from the second virtual local area network is a virtual private network requiring the use of the internet protocol security (IPSec) suite of internet protocols.

8. The method of claim 5, wherein the first virtual local area network is associated with network policies allowing access to enterprise applications and electronic mail.

9. The method of claim 5, wherein an internet protocol configuration information used by the client device for network connection internet does not change when the association of the client device changes from the first virtual local area network to the second virtual local area network.

10. The method of claim 5, wherein the communication originated by the client device while associated with the first virtual local area network is one of a request for streaming video, a database lookup, a request to initiate a voice-over-Internet Protocol session, a port communication through one of a gateway component and other network element, or a communication originating network traffic that alerts an intrusion detection system.

* * * * *